United States Patent
Parker et al.

(10) Patent No.: US 9,518,829 B2
(45) Date of Patent: Dec. 13, 2016

(54) DRIVING ASSISTANCE SYSTEM, VEHICLE AND METHOD

(71) Applicant: Jaguar Land Rover Limited, Coventry (GB)

(72) Inventors: Dirk Parker, Coventry (GB); Kevin Cockings, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/773,768

(22) PCT Filed: Mar. 10, 2014

(86) PCT No.: PCT/EP2014/054550
§ 371 (c)(1),
(2) Date: Sep. 9, 2015

(87) PCT Pub. No.: WO2014/139929
PCT Pub. Date: Sep. 18, 2014

(65) Prior Publication Data
US 2016/0018228 A1    Jan. 21, 2016

(30) Foreign Application Priority Data

Mar. 11, 2013 (GB) .................................. 1304317.9

(51) Int. Cl.
*G01C 21/28* (2006.01)
*G01C 21/36* (2006.01)
(Continued)

(52) U.S. Cl.
CPC ........... *G01C 21/28* (2013.01); *G01C 21/3415* (2013.01); *G01C 21/3602* (2013.01);
(Continued)

(58) Field of Classification Search
CPC . G01C 21/28; G01C 21/3415; G01C 21/3602;
G01C 21/3623; G01C 21/3667; G05D 1/0212; G05D 1/0246; G05D 1/0274; G05D 1/0278; G05D 2201/0213; C08G 1/22; C08G 1/66
(Continued)

(56) References Cited

U.S. PATENT DOCUMENTS 6,061,055 A     5/2000  Marks
8,644,858 B2 *  2/2014  Nagai ................... H04W 4/021
                                                    455/456.6

(Continued)

FOREIGN PATENT DOCUMENTS

DE   10 2011 085 644 A1   5/2013
EP       1 298 621 A2     4/2003
(Continued)

OTHER PUBLICATIONS

International Search Report, PCT/EP2014/054550, Jun. 25, 2015, 5 pages.
(Continued)

*Primary Examiner* — McDieunel Marc
*Assistant Examiner* — James E Stroud
(74) *Attorney, Agent, or Firm* — Myers Bigel, P.A.

(57) ABSTRACT

A dynamic route finding system for a follower vehicle comprises a display, for disposition inside the vehicle, a navigation system, employing satellite position sensing for the vehicle, a storage device, including map data of a given territory, and an input system for the navigation system to input the location of a potentially dynamic destination of a subject (vehicle), wherein the navigation system is arranged to permit dynamic updating of the destination through said input system whilst guiding the user towards the subject from its current position. The input system may comprise an optical sensor, for front-facing disposition in the vehicle; a computer, to display on the display images captured by the (Continued)

optical sensor; and a user interface, enabling user commands to be input to the computer, the computer being arranged dynamically to calculate the position of a subject that is captured as an image by the optical sensing means, that has been displayed on the display, and that has been selected by the user, and to input said position as the dynamic destination of the navigation system. The input system may also comprise a telephone transceiver capable of wireless communication with another telephone, whereby the navigation system and a subject telephone may be interconnected and through which the subject telephone, when provided with a requisite application and a GPS position sensor, transmits the position of the subject telephone to the navigation system for use as the destination of the navigation system of said follower vehicle. The input system may also comprise a network of communication modules in multiple vehicles.

20 Claims, 6 Drawing Sheets

(51) Int. Cl.
    *G08G 1/00*     (2006.01)
    *G05D 1/02*     (2006.01)
    *G01C 21/34*     (2006.01)
    *G08G 1/16*     (2006.01)

(52) U.S. Cl.
    CPC ..... *G01C 21/3623* (2013.01); *G01C 21/3667* (2013.01); *G05D 1/0246* (2013.01); *G05D 1/0274* (2013.01); *G05D 1/0278* (2013.01); *G08G 1/22* (2013.01); *G05D 2201/0213* (2013.01); *G08G 1/166* (2013.01)

(58) Field of Classification Search
    USPC ........................................................ 701/412
    See application file for complete search history.

(56) References Cited

U.S. PATENT DOCUMENTS

| | | | |
|---|---|---|---|
| 9,098,752 B2 * | 8/2015 | Huntzicker | ............ B60Q 9/008 |
| 2004/0204847 A1 | 10/2004 | Yanai | |
| 2008/0071474 A1 | 3/2008 | Harayama et al. | |
| 2013/0030606 A1 | 1/2013 | Mudalige et al. | |
| 2014/0005941 A1 | 1/2014 | Paek et al. | |

FOREIGN PATENT DOCUMENTS

| | | |
|---|---|---|
| EP | 1 852 325 A1 | 11/2007 |
| EP | 2 019 290 A2 | 1/2009 |
| WO | WO 2004/077378 A1 | 9/2004 |
| WO | WO 2011/098107 A1 | 8/2011 |

OTHER PUBLICATIONS

Combined Search and Examination Report, GB 1304317.9, Aug. 22, 2013, 6 pages.

* cited by examiner

DRIVING ASSISTANCE SYSTEM, VEHICLE AND METHOD

RELATED APPLICATIONS

This application is a 35 U.S.C. §371 national stage application of PCT Application No. PCT/EP2014/054550, filed on Mar. 10, 2014, which claims priority from Great Britain Patent Application No. 1304317.9, filed on Mar. 11, 2013, the contents of which are incorporated herein by reference in their entireties. The above-referenced PCT International Application was published in the English language as International Publication No. WO 2014/139929 A1 on Sep. 18, 2014.

TECHNICAL FIELD

This invention relates to a driving assistance system, a vehicle and to a method of operation of the vehicle. Aspects of the invention relate to a system, to a vehicle and to a method.

BACKGROUND

It is often the case that the driver of a vehicle wants to follow a vehicle in front. Perhaps only the driver of the vehicle in front knows the way to a desired location. That driver needs to be aware of the presence of the vehicle behind, and to pull over, speed up or slow down, depending on the progress of the follower vehicle. Likewise, the person driving the follower vehicle needs to be aware at all times of the location of the vehicle they are following. Indeed, more so, because, should the followed vehicle turn off the road unexpectedly, it is easy for the following driver to miss this and to end up driving past and the vehicles becoming separated. The problem occurs because the driver of the follower vehicle, particularly in heavy traffic, often has too many things to think about and to handle, and may have to suspend concentration on following the vehicle in front to deal with more important issues. Other occasions also require one vehicle to follow another. Sometimes, it is desired simply to "go in convoy", whether both drivers know the route or not. However, on such journeys it is sometimes not known when one vehicle stops, for refuelling or because of some problem, or simply which vehicle is in front. This is a particular issue during heavy traffic on long journeys. At other times, perhaps police vehicles need to follow a suspicious car.

There are other cases where it might be desirable to follow the precise course of another vehicle. One example is in off-road driving where a lead vehicle might have an experienced driver or one who knows the terrain and follower vehicles should follow substantially exactly the same route. Indeed, whether off-road or otherwise, there may be circumstances where control of a vehicle might best be handled by a system capable of following another vehicle. It would certainly be desirable for a vehicle to have a system capable of following another vehicle or even a person, such as a cyclist, or at the least to be able to navigate to a location not necessarily known to the driver of the vehicle.

US-A-2006/0221328 discloses homing systems applicable to pairs of objects (such as, e.g., ground vehicles, watercraft, aircraft, spacecraft, etc.) wherein one or both of the objects are moving (such as moving in two-dimensions or three-dimensions) and one or both of the objects may be unmanned. When paired objects are disposed in line of sight (LOS) of each other, with one object having disposed thereon an automatic frequency emitter emitting at least two frequencies (preferably at least two frequencies wherein the frequencies are in a range of light, most preferably, laser light), the other object may automatically follow that object having the emitter disposed thereon, with the following being accomplished by using an automatic detector that detects the emitted frequencies, with the detecting and following operations most preferably accomplished completely without needing a human operator. The need for human operators may be eliminated in certain contexts, such as dangerous operations. Such a system requires both vehicles to be adapted for the task of one following the other.

Japanese Patent Publication No. 60-33352 discloses a method of following an image of a preceding vehicle as sensed by an image sensor such as a video camera. According to this method, the driver of a vehicle needs to manually set and continuously adjust an image-following gate or window enclosing an object to be followed on a display screen while looking at the screen, so as not to lose sight of the image of the preceding vehicle.

U.S. Pat. No. 5,304,980 discloses distance detecting apparatus for a vehicle which, once the driver sets an image-following window enclosing a target preceding vehicle, is able to measure the distance to the target preceding vehicle in an automatic fashion, without the need of any movement of the apparatus, provided that the preceding vehicle lies in the field of view of the apparatus. The distance detecting apparatus comprises a pair of optical sensing means each for optically sensing a plurality of objects and generating a corresponding image signal; first memory means for storing the output image signal from one of the optical sensing means as a first image signal; second memory means for storing the output image signal from the other of the optical sensing means as a second image signal; a display with a screen for displaying the images of the objects as sensed by the optical sensing means; window setting means for successively setting an image-following window on the screen of the display at a location enclosing a target preceding vehicle as well as a plurality of distance-measuring windows at predetermined locations on the screen of the display; distance calculating means for comparing the images of the objects in the respective windows stored in the first memory with the corresponding images of the objects stored in the second memory so as to detect deviations therebetween, the distance calculating means individually calculating the distance to an object in each window based on the calculated deviations; and image-following-window updating means for successively comparing at predetermined intervals an image in the image-following window, which is currently sensed by one of the optical sensing means and stored in the first memory, with an image of the target vehicle, which was previously sensed by the one of the optical sensing means and stored in the first memory, so as to update the image-following window at a location which provides the best match therebetween. However, the use made of the apparatus is not explained.

Some modern vehicles are provided with front-facing cameras for the purpose of emergency braking in the event that a driver is not paying attention, or in any event when a collision appears inevitable. Braking in this event is to mitigate the effects of a collision rather than prevent a collision. By the time an automatic system has calculated that it is too late for a driver of the vehicle to avoid a collision by voluntary means, it is also too late for the automatic system to avoid. However, while it remains feasible for the driver to avoid a collision, the current course and speed of the vehicle may be for good reason and it is not acceptable for an automatic system to override the control of a human driver in this circumstance. However, once a collision becomes inevitable, the vehicle can automatically attempt to mitigate the effects of the collision, by applying the brakes, based on the presumption that this is in the best interests of all concerned. In order to avoid a collision, some systems at least warn the driver, by some means, when a collision appears likely. Such systems rely on forward facing object sensing means that measure the distance to objects in front, for example, using radar or, indeed, video cameras. Video cameras, or at least computers supplied with their image data, now have sophisticated image recognition capabilities that enable them to detect that an object is in the field of view, its distance from the camera and its relative speed in relation to the camera. The image processing of such cameras can be very sophisticated and, hence, expensive. Less expensive cameras are sometimes employed to recognise road signs and to warn drivers, for example, when they are exceeding a speed limit, or approaching a bend. They are less sophisticated since the task of recognising what a road sign says is relatively trivial compared with distinguishing objects in the path of a vehicle.

Some vehicles are provided with satellite navigation equipment. Satellite navigation equipment ("SatNav") is based on a GPS (global position sensing) system that triangulates a vehicle's position, and the direction in which it is facing, from signals received from several satellites. Implicit in such a system is an accurate map of the region in which the vehicle is driven. Most SatNavs integrate the position sensing system with the map to correlate position and direction sensed by the system with likely position and direction on the map. Ultimately, if the SatNav's calculation of position (based on speed and anticipated direction on a road of the map, for example following a pre-programmed route), departs too far from the GPS-sensed position and direction, then the GPS-sensed position and direction takes precedence and the system assumes that the vehicle is deviating from the road, possibly following an alternative (perhaps unmarked) road, or going off-road.

It is an aim of the present invention to provide a convenient system enabling a preceding vehicle to be followed.

SUMMARY OF THE INVENTION

In accordance with an embodiment of the invention there is provided a dynamic route finding system for a follower vehicle, the system comprising:
- a display, for disposition inside the vehicle;
- a navigation system (SatNav), employing satellite position sensing for the vehicle;
- a storage device, including map data of a given territory;
- an input system for the navigation system to input the location of a potentially dynamic destination,
- wherein the navigation system is arranged to permit dynamic updating of the destination through said input system whilst guiding the user towards said destination from its current position.

In one embodiment, said input system comprises:
- an optical sensor, for front-facing disposition in the vehicle;
- a computer, to display on the display images captured by the optical sensor; and
- a user interface, enabling user commands to be input to the computer, the computer being arranged dynamically to calculate the position of a subject that:
  i) is captured as an image by the optical sensing means, and
  ii) has been displayed on the display, and
  iii) has been selected by the user, and
  to input said position as a destination of the navigation system.

The subject may be a vehicle. The optical sensor may be a camera. Where the optical sensor comprises a camera, said camera may be integrated into a follower vehicle, for example in the form of a front-facing camera for the primary purpose of emergency braking or recognising road signs. Alternatively, the camera may be incorporated into a nomadic device, for example including but not limited to a mobile telephone, a tablet, a phablet or a portable computer, brought in to the vehicle by an occupant thereof. In this case the nomadic device may include the computer or the navigation system. Alternatively, the computer or navigation system may be comprised within the follower vehicle and the nomadic device may be arranged in communication there-with. In one embodiment, the input system is adapted to update the position of the subject when the subject moves. Said updating may be periodic or continuous. Said position may be estimated from historical movements of the subject.

In another embodiment, said input system comprises a telephone transceiver capable of wireless communication with another telephone, whereby the navigation system and a subject telephone may be interconnected and through which the subject telephone, when provided with a requisite application and a GPS position sensor, transmits the position of the subject telephone to the navigation system for use as the destination of the navigation system of said follower vehicle.

The application in the subject telephone may be adapted to transmit the position of the subject telephone as and when that position changes, in which event, the input system updates the destination of the navigation system when a new position of the subject telephone is received.

In this scenario, a driver of the follower vehicle in which the dynamic route finding system is fitted may communicate via the transceiver with a person holding a subject telephone and initiate transmission of the subject telephone's position, whereby the driver can navigate, using the SatNav, to the person holding the subject telephone. In one situation, the person holding the subject telephone may be located in a lead vehicle which the driver wishes to follow. In this embodiment, line of sight and use of a camera to keep track of the vehicle is not necessary. On the other hand, corroboration or back up of a camera-based system and a telephone based system is perfectly reasonable. For example, the telephone system can be employed when line of sight is lost, whereas the camera system can be employed when either the telephone or the transceiver are out of range of mobile telephone transmitters.

The transceiver may be integrated with the SatNav. It may be provided for on-board integration in the car separate from the SatNav. It may be a simple, and entirely separate, mobile telephone of the driver of the follower vehicle in which the dynamic route finding system is fitted. The separate mobile telephone in this event includes a connector for connection with the SatNav. Said connector may also be wireless, for example using Bluetooth® technology, or may comprise a wired connection.

In another embodiment, said input system comprises an inter-vehicle wireless communicator, wherein the follower vehicle is provided with communication apparatus that enables communication with multiple adjacent vehicles in the vicinity of the follower vehicle and also provided with similar communication apparatus, and through said adjacent vehicles with more distant, remote vehicles also provided with similar communication apparatus, whereby a communication network of vehicles may be established, wherein one of said adjacent or remote vehicles is the subject vehicle and comprises position sensing apparatus (possibly GPS) so that the position of the subject vehicle may be communicated through said network to the follower vehicle and input as the destination of that vehicle's SatNav.

Said guiding by the SatNav may be through the provision of instructions to the driver of the vehicle, which instructions may be audible, oral, visual or graphic. Alternatively, said guiding may be active control of the follower vehicle. It may include, not merely driving the follower vehicle to the destination of the subject vehicle, but also by following the route of the subject vehicle in reaching its current location. This might be especially useful in off-road navigation where the follower vehicle is not limited by the normal desire to stay on a road but can simply take a straight-line route. Active management of the steering for example, can enable a follower vehicle to take the same path as a subject vehicle.

Thus, in one embodiment, a "Follow-me" mode of operation of the SatNav is provided which may be invoked in a method of operating a follower vehicle incorporating a dynamic route finding system as defined above, the method comprising the steps of:
a) invoking a "Follow-me" function of the navigation system;
b) operating the input system to enter the position of the subject as a destination for the navigation system;
c) updating the destination as the subject moves; and
d) providing user navigation system instructions to drive to the destination.

In one embodiment, operating the input system comprises the steps of:
e) positioning the vehicle behind a subject vehicle to be followed;
f) displaying the image captured by the optical sensor on the display;
g) selecting a subject to be followed; and
h) calculating the position of the subject using the position of the follower vehicle as the basis therefor.

In an embodiment, the computer correlates a change in the image of the subject with its position relative to the follower vehicle, whereby its intended route of travel may be predicted. Thus, should the shape of the image change, which change is consistent with a road junction and the subject making a turn, then it can be predicted that the subject (a vehicle to be followed) is indeed making such a turn and the destination can be updated and requisite guidance given to facilitate the driver of the follower vehicle to make the same turn. Information that may also be employed to predict a turn may be a change in ground speed of the subject or even a change in relative position of the vehicle on the road if the road is large. Similarly, if the size of the image of the subject vehicle should change, this may be employed to compute a change in distance of the subject from the follower vehicle.

In one embodiment, the camera may detect, and the computer recognise from the image data, the application of brake lights of a selected vehicle and/or the application of direction indicator lights, and use such information for predictive purposes. For example, if the brake lights are operated prior to a vehicle approaching a road junction, this may be because the vehicle is about to take a turn. On a road where the map suggests no other reason for slowing (for example, a main road proceeding in a straight direction with a road junction joining from one side), where the SatNav has no information about traffic signals at the junction and vehicles on the main road are most likely to have a right of way, brake lights being illuminated and accompanying slowing of the vehicle may be indicative of the subject vehicle being about to turn. The same would be true if the subject vehicle's direction indicator lights were to be detected, especially at a crossroads, for example where brake lights alone might not be adequate to determine a direction to be taken by the subject vehicle.

In any event, the SatNav may be programmed, when in the "Follow-me" mode of operation, to give instructions based on the known position of the subject vehicle and, when the vehicle disappears from view of the optical sensing means, on predicted position.

Thus the present invention provides a new application for two existing pieces of equipment that may be provided in a modern vehicle, namely the optical sensor, especially of an emergency braking system, and satellite navigation. Either system may include the computer that correlates the data from the other and provides the SatNav with the requisite data. Alternatively, a separate computer may be employed.

In one embodiment, the display is a touch screen whereby instructions as to the identity of a subject to be followed may be indicated by touching the screen in the vicinity of the subject to be followed. The subject may be indicated as a subject identified by the computer from the image data currently received from the optical sensor by highlighting the subject, for example by surrounding it with a rectangular outline of its basic shape. If no subject is identified at the time of selection then no selection can be made and it may be necessary to close the distance between the vehicle and the subject in order to recognise the subject vehicle as such. Once recognised as a subject, salient features of it may be recorded in a memory so that it can be recognised in the future through one or more of said features remaining in view of the optical sensor while the subject is being followed, and it being re-recognised if and when it comes back into view of the optical sensor if a direct line of sight is temporarily lost, for example by another object vehicle coming between the subject vehicle and the follower vehicle. Salient features that may be employed are shapes and dispositions of rear light clusters, the shape of rear windscreen, registration plate position and optical character recognition of the number of the registration plate, vehicle paint colour, and other characteristic features such as company logos, spare wheels, rear boot (trunk) handles, decals in rear windows etc. Indeed, it would be advantageous to record many visible details of the subject vehicle, whereby the vehicle may be recognised when it is only partially visible. In such situations, subject vehicles would often be recognisable to drivers in traffic and therefore ideally they should be recognised by the Follow-me system of the present invention.

When the subject vehicle disappears from view of the optical sensor, when in the "Follow-me" mode of operation, the SatNav may still provide directions to the last known position. A warning may be given that the vehicle has disappeared and that predictive instructions are being given. In the meantime, the computer will analyse the image data attempting to spot the subject vehicle and relocate its position and resume normal service.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with on embodiment or aspect are applicable to all other embodiments or aspects, unless incompatible therewith.

BRIEF DESCRIPTION OF THE DRAWINGS

Embodiments of the invention are further described hereinafter, by way of example only, with reference to the accompanying drawings, in which.

DETAILED DESCRIPTION

Figure 1:
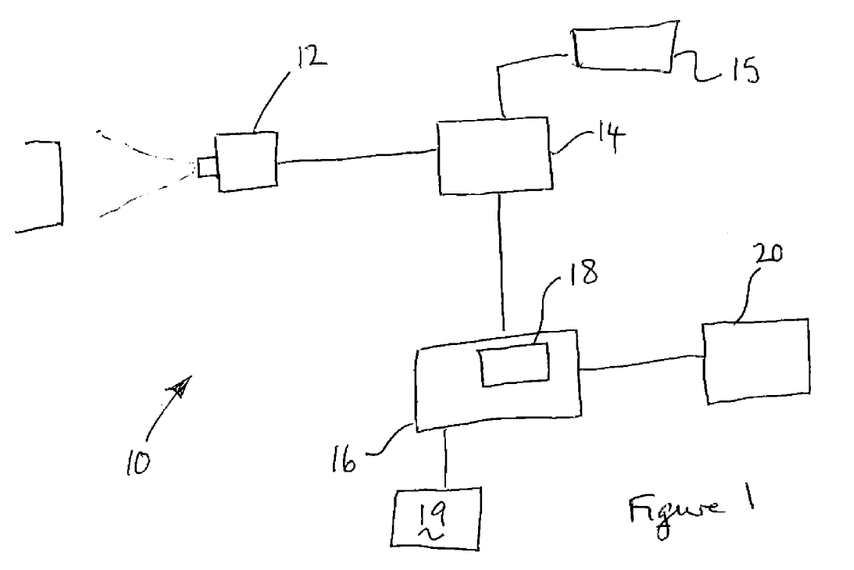
FIG. 1 is a schematic of a Follow-me system according to one embodiment of the present invention.

In FIG. 1, a Follow-me system 10 for a vehicle comprises a front-facing camera system 12. The camera system 12 may form part of an emergency braking system that analyses images of objects for the purpose of initiating warnings of objects, such as vehicles or pedestrians, in the path of the vehicle and/or applying the vehicles brakes if necessary to mitigate the effects of a collision. As such, the technical means of detecting and recognising solid objects already exists and Euro NCAP is an organisation that sets objectives and tests vehicles for compliance and safety. One area of interest is in object recognition systems for safety applications. Such a system already involves sophisticated image processing to recognise objects and calculate distances thereto. Some systems also employ radar as well as visible light camera systems. The present invention does not exclude the possibility of supplemented information from radar or other means, for example, ultrasonic transponders. Cameras are also employed for road-sign recognition to warn drivers of circumstances that might be problematic, for example when the vehicle is travelling faster than a speed limit permits.

Thus the camera 12 will already be connected to computing means of some description but in FIG. 1 an entirely independent computer 14 may be connected that is itself connected to a vehicle satellite navigation system 16. Again, satellite navigation systems (SatNav) are well known and any may be adapted for the purposes of the present invention. The SatNav 16 has a display 18 which may include a graphical user interface; alternatively, or in addition, a separate user interface 20 is provided to enable commands to be given to the SatNav 16.

In the following description of the Follow-me system, the term "follower vehicle" refers to the vehicle in which the Follow-me system 10 is fitted and whose driver wishes to follow another vehicle, or at least drive to a potentially dynamic destination (by "potentially dynamic" is meant that the destination may have the possibility of moving, and may move, while it is being navigated to by the SatNav in the follower vehicle, but not always necessarily so). A vehicle being followed or other potentially dynamic destination is henceforth referred to as "the subject vehicle". "Objects" or "object vehicles" may be third party vehicles or objects of no relevance to the Follow-me system other than interference therewith.

Figure 2:
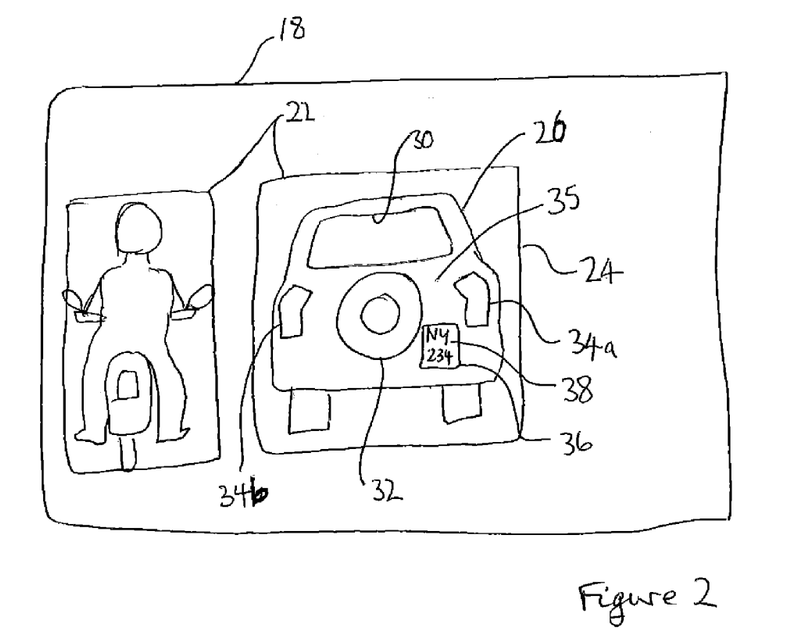
FIG. 2 is a view of a display of the system of FIG. 1 showing objects to be selected.

To initiate the Follow-me system 10, the user interface 20 is invoked, to select a "Follow-me" option of the SatNav system 16. The SatNav system 16 then displays on the display 18 the image collected by the camera 12. The computer 14 analyses the image received to identify objects in the field of view of the camera 12, employing the same techniques used in existing emergency braking systems, known to those skilled in the art. Identified objects are highlighted on the screen 18, for example by surrounding them with a rectangle 22 (see FIG. 2). If the subject vehicle that the driver of the follower vehicle wishes to follow is highlighted, it may be selected by the driver. If the screen 18 is a touch screen, selection may be made by touching the image within its rectangle of the subject vehicle. Feasibly, the follower vehicle needs to be close to, perhaps within about 30 meters of, the subject vehicle in order for the vehicle to be recognised. Its distance and heading from the follower vehicle is then calculated by the computer 14 and this information is provided to the SatNav 16 as a position relative to the follower vehicle. The SatNav system then calculates the position of the subject vehicle from this information and the position of the follower vehicle, which is known by SatNav system 16 employing its usual means of position identification and heading of the vehicle in which it is fitted.

In the meantime, the computer 14 analyses the image (say image 24) of the subject vehicle 26 and stores in a memory data representative of image features of the vehicle 26. Such features may comprise, shape features, for example rear windscreen outlines 30 or spare wheel outlines 32 and/or rear light cluster shapes 34a,b. There may also be recorded relative position information including for example, spacing of the rear light clusters or height with respect to ground or roof. The colour 35 of the vehicle may be recorded. The computer 14 may also note the position of a registration plate 36 and may have optical recognition capability to discern the alpha-numeric number 38 on the registration plate. In fact, any and as many as possible identified features are stored. Some such features may comprise reflections or other artefacts. However, the computer may be arranged to update the features stored as they change when the subject and follower vehicles move, both with respect to the ground and with respect to each other so that the features that remain, and which are not deleted because they disappear in different light conditions, become more robust as visual identifiers of the subject vehicle.

Figure 3:
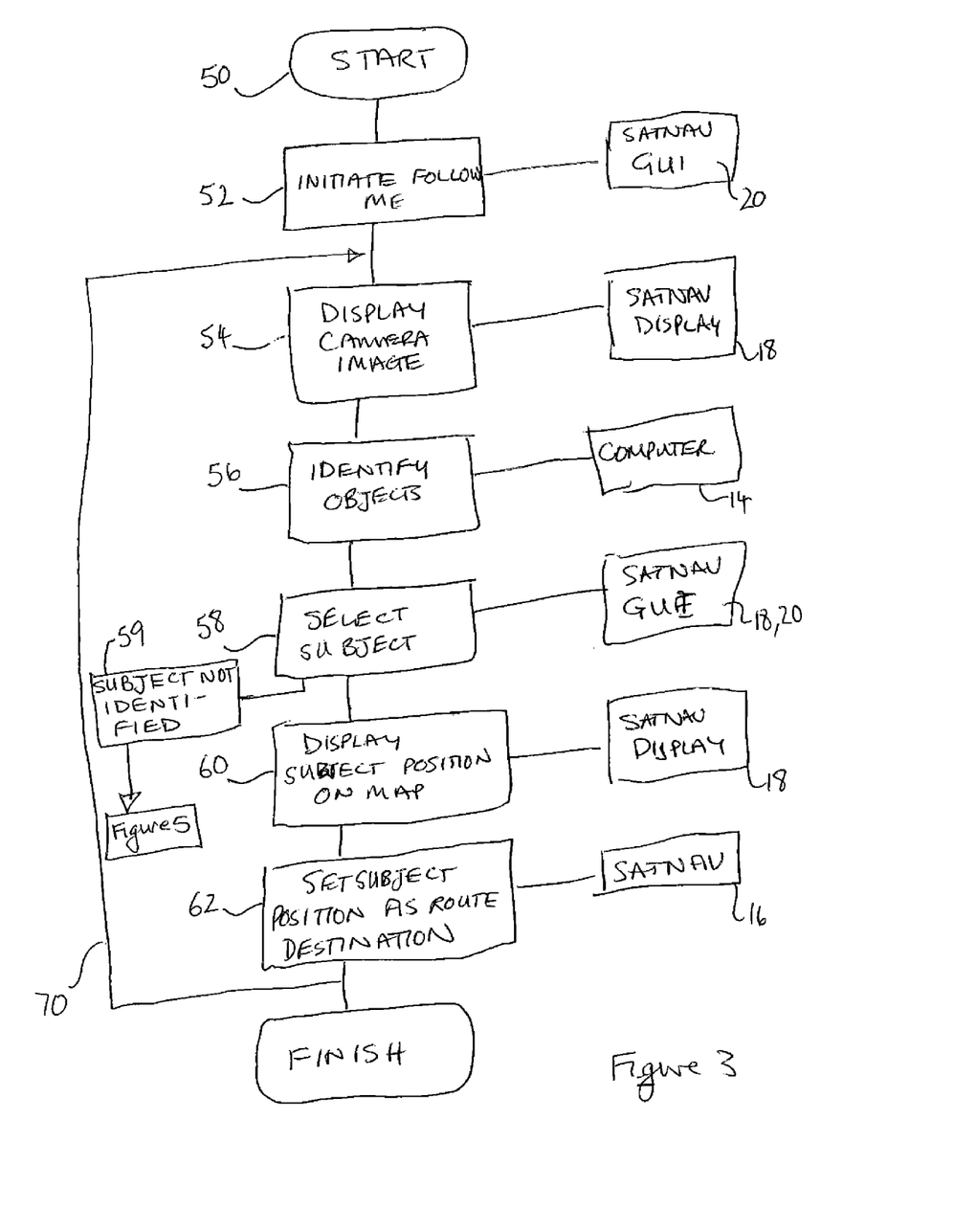
FIG. 3 is a flow diagram of a potential sequence of tasks completed by the system of FIG. 1.

FIG. 3 illustrates the basic flow chart of the above described process. The start 50 commences when the SatNav 16 is powered up. Step 52 is taken when the Follow-me system is initiated by operation of the graphical (or other) user interface 20. Step 54 is the display of the image captured by the camera 12 on the display 18. Step 56 is performed by the computer 14 to identify on the display objects detected in the image and to highlight them in the display 18. Highlighting is an option, of course; this is not essential and merely confirms to the user that the subject vehicle has been identified by the system. Changing the highlighting also is an optional feature when the subject vehicle is selected in step 58, but this also serves to confirm that selection to the user.

What is next displayed on the screen 18 is optional. It may comprise only the normal map (downloaded from storage device 19 in FIG. 1, which device may comprise a CD or DVD containing map data covering a wide territorial area), or it may comprise the map on one part of the display and the camera image on another part of the display—perhaps half each. On the map, however, the SatNav displays in step 60 the position of the subject vehicle on the map and sets it in step 62 as the usual selected destination of the SatNav system. The driver of the follower vehicle then drives to that destination following the usual directions given by the SatNav system 16.

Figure 4:
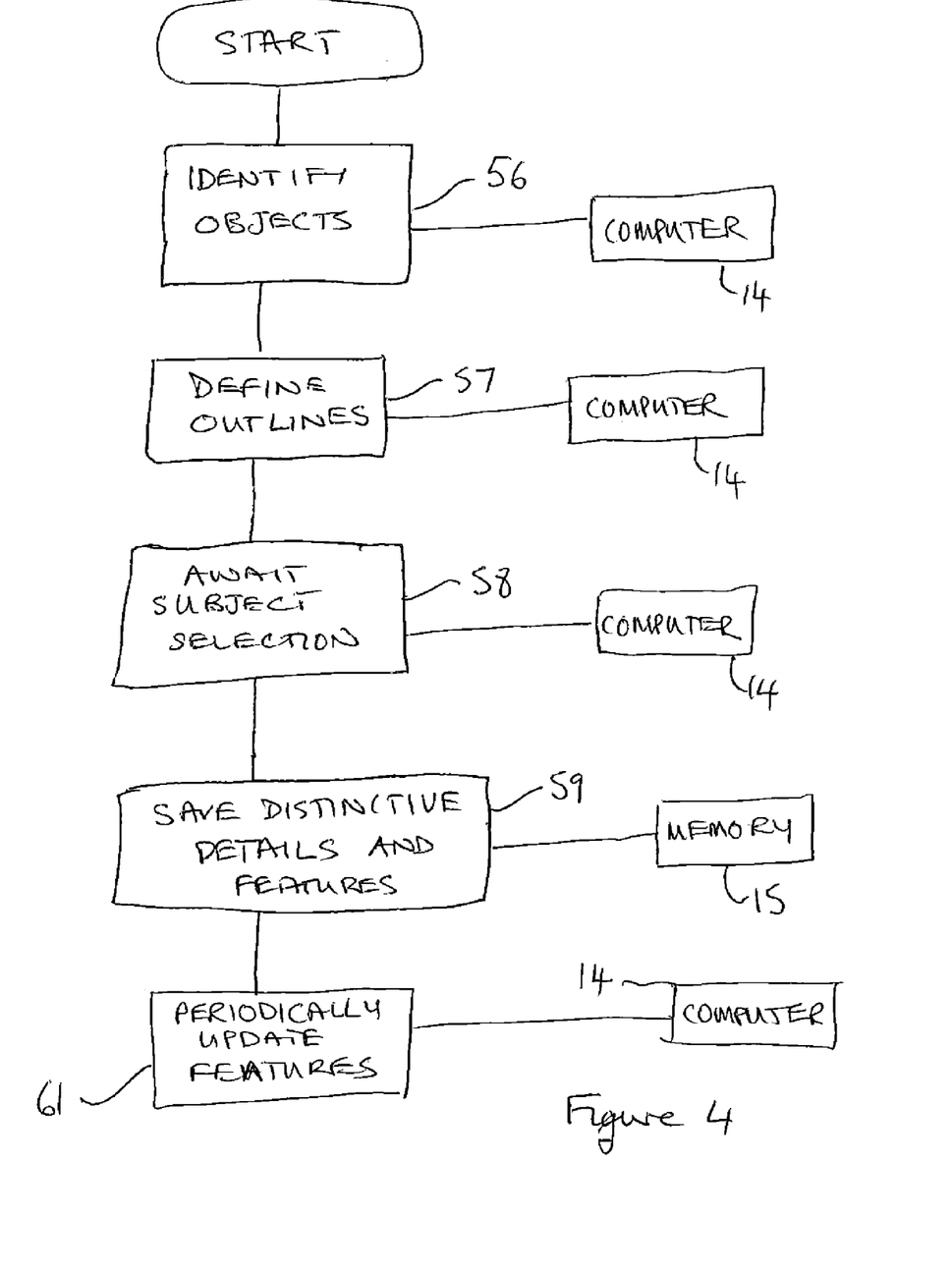
FIG. 4 is a subset of tasks from FIG. 3.

It is to be supposed, of course, that the subject vehicle moves, otherwise the foregoing activity would be somewhat pointless. Before dealing with the subject vehicle moving, however, step 56 also involves a parallel routine illustrated in FIG. 4 of, after identifying objects in the image in step 56, and highlighting them in the display in step 57, and after the subject vehicle is selected in step 58, salient features 30-38 (from FIG. 2) are identified by the computer 14 and saved in its memory 15 (see FIG. 1). These features are updated periodically, as described above, in step 61.

When the subject vehicle moves, however, the image captured by the camera 12 changes. After a period of time the routine described above and illustrated in FIGS. 3 and 4 is repeated (see arrow 70 in FIG. 3) except that, instead of requiring the user to select the subject to follow in step 58, the computer 14 compares objects identified (in step 56) in the new image with the features data stored in its memory 15, and itself selects the subject vehicle as the destination. In step 60, the system then displays the position of this new destination on the SatNav map and resets desired destination for the SatNav system 16. Of course, the SatNav system 16 must be arranged to accommodate constantly changing destinations. Whether the image captured by the camera system 12 is actually repeatedly displayed in step 54 on the display 18 (as a video picture, assuming the routine is repeated rapidly) is optional. It is not essential and may detract from the SatNav instructions. Equally, it could be useful to re-assure the driver that the subject vehicle being tracked is indeed the vehicle it is desired to follow.

From time to time, line of sight with the subject vehicle will be lost from the follower vehicle. This may be partial, because one or more third party object vehicles intervene in traffic, as tends to occur naturally, and which at least partially obscure the image of the subject vehicle. In this event, the computer attempts to identify the subject vehicle from the limited image features 30-38 that the camera does detect. This may be sufficient to continue confident identification and location of the position of the subject vehicle.

Figure 5:
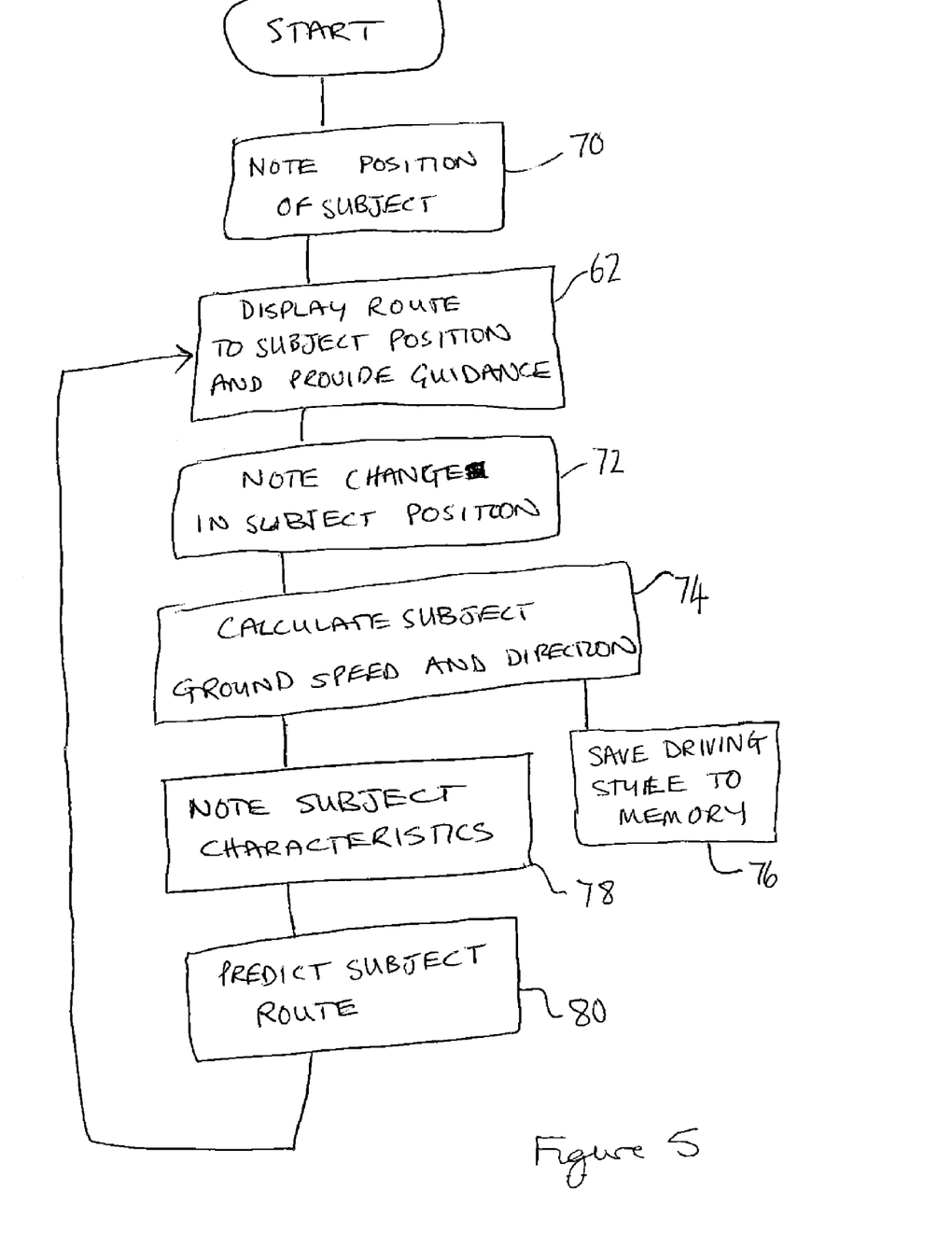
FIG. 5 is a flow diagram of a method of operation of the system of FIG. 1.

However, from time to time, complete loss of view of the subject vehicle may be experienced. In this event, a predictive algorithm is employed as illustrated in FIG. 5. In fact, this algorithm is invoked in parallel with the routines described above, while the subject vehicle is visible.

In step 70, the current position of the subject vehicle is noted and recorded in the memory 15. Step 62 from the routine in FIG. 3 is then followed, as per that routine. Next, in step 72, the change in position of the subject vehicle is noted, after a predetermined delay. This enables the heading and ground speed of the subject vehicle to be calculated in step 74. Furthermore, a driving style can be determined for the subject vehicle (e.g. typical speed at bends or on straight road) and saved to the memory 15, in side step 76. In step 78, characteristics of the subject vehicle are noted. Such characteristics may comprise a sudden illumination of the brake lights of the subject vehicle or the activation of the direction indicator lights. Other characteristics may comprise positioning of the vehicle in the road. Further characteristics may comprise a change in the shape of the vehicle, consistent with it making a turn so that the view of it changes from a rear view to a side view. Such characteristics, to have predictive value, are correlated with map information from the SatNav 16 concerning the location of the vehicle and upcoming road junctions. On the basis of this information and the driving style recorded in step 76, the future position of the subject vehicle can be predicted in step 80 by the computer 14. As a journey progresses, the accuracy of the computer's prediction of a subsequent position of the subject vehicle can be tested and measured against actual subsequent position. However, when a complete loss of sufficient object data is experienced to identify the subject vehicle, step 59 is invoked in the routine of FIG. 3 whereby the subject position and the desired destination to be communicated to the SatNav system 16 is the predicted vehicle position predicted in step 80. The user may be informed by a warning that predictive navigation is now in place, and a level of confidence in the predicted route may be given by the computer 14 in dependence upon the time since loss of sight of the vehicle and the potential reasons for loss of sight, especially given the potential characteristics noted in step 78. Thus, if the system noted the subject vehicle braking and indicating, and noted the approach of a road junction ahead and the deceleration of the subject vehicle was consistent with a potential turn into the junction, and the vehicle disappeared from view when it reached the junction, the level of confidence that the subject vehicle made a turn at the junction may be very high. Alternatively, if the subject vehicle disappears into the distance, for example, and can no longer be identified, and numerous junctions appear in the road, the level of confidence that the subject vehicle has taken a particular route may rapidly diminish to zero.

Nevertheless, while out of sight, and until the Follow-me function is disabled, the system continues to hunt for the subject vehicle and, if and when it returns to view, the system picks up again at step 60 of FIG. 3.

Figure 6:
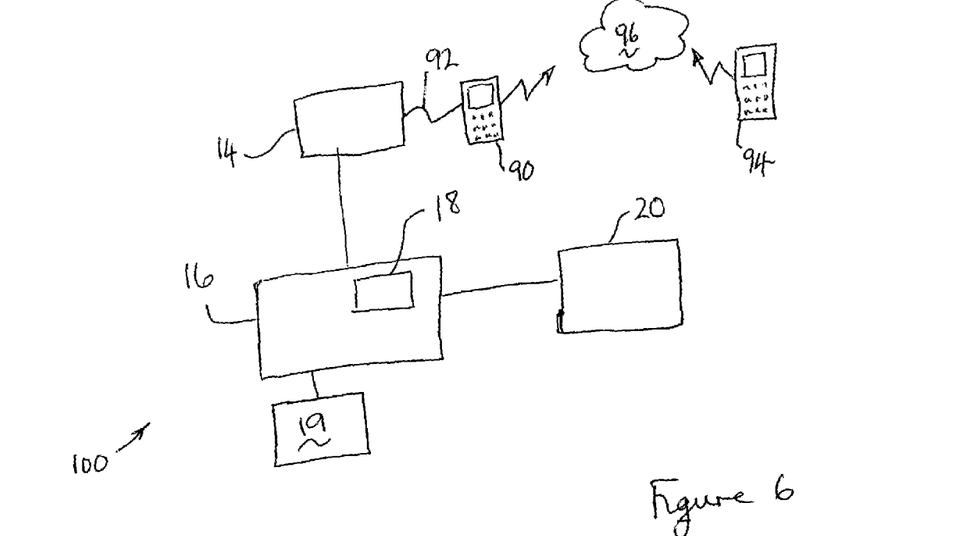
FIG. 6 is a schematic of a Follow-me system according to another embodiment of the present invention.

An alternative or additional system 100 is illustrated in FIG. 6. Here, a mobile phone 90 in the follower vehicle is connected to computer 14 by link 92, which may be hard-wired or may be wireless, typically using Bluetooth®-type technology. Indeed, the phone 90 may be integrated with the computer 14, which itself, as described above, may be integrated in the SatNav system 16, or be separate therefrom as shown in FIG. 6.

In any event, the "follower" phone 90 has the capacity to connect to a subject phone 94 through a mobile telephone network 96. The subject phone 94 may be carried in a subject vehicle or it may be elsewhere, for example at another location distant from the subject vehicle. For the system to operate as described below, the subject phone potentially requires two features. The first feature of the phone is a position sensing means, whereby it has the capacity to sense and record its own position. Secondly, it requires an application that is capable of transmitting its recorded position to the follower phone 90 via the mobile network 96. Such transmission might conveniently be by a text message, using SMS (Short Messaging Service) for example. The requisite application may be one that is stored on the follower phone and is transmitted to the subject phone, once a telephone connection has been established, for installation in the subject phone when desired.

However, the invention is not limited by the subject phone necessarily incorporating position finding ability. Any suitable means of phone position identification and communication may be employed. For example, it may be feasible for a mobile telephone service operating the network 96 to be configured to locate the position of the phone 94, for example by triangulation using several telephone signal transmitters, or by other means, and to transmit that location to the follower phone 90. Such may be done without the subject phone having any direct involvement in the process, except, perhaps, in giving the telephone service provider permission to transmit its location to the follower phone.

In either case, the application on the phone 90, or the mobile telephone service transmitting the subject phone's location, may be configured to transmit the phone's position once, provided acknowledgement is received from the follower phone 90, and then only to do so again if the position of the subject phone has changed significantly or if a substantial time has elapsed and retransmission is justified to confirm that connection exists between the phones 90, 94. What constitutes "significant" in the change of position may depend on the speed of change. For example, a high speed of change may require updating more often than a low speed. Conversely, computer 14 may be able to calculate a route on its map being followed by the subject phone and expect or predict certain changes in the position of the phone 94, for example, if it is travelling along a motorway. Thus it may be an option that the computer 14 requests an update of the position of the phone 94 from time to time to check its location. Likewise, how frequently there should be retransmission of the position of a stationary subject phone is a matter of choice. Again, the follower phone 90 may request updates, possibly with increasing frequency as it approaches the destination.

From the foregoing, it will be apparent that the system 100 is arranged to receive the position of the subject phone 94 which is input to the SatNav system 16 as potentially dynamically changing destination for the SatNav to guide the follower vehicle in which it is fitted towards that destination, regardless of how it changes.

Moreover, it is evident that the system 100 is not merely an alternative to the system 10 of FIG. 1 but could be employed as a backup system, whereby if and when line of sight is lost and the system has to progress in predictive mode, this can be over-ridden or checked using the system 100. Likewise, the system 10 can be employed as a backup or cross-check of the system 100 of FIG. 6, for example when either phone is out of range of a mobile telephone transmitter forming part of the network 96. Thus preferably, the systems 10,100 are integrated so that either or both may be employed, each cross-checking the other.

Figure 7:
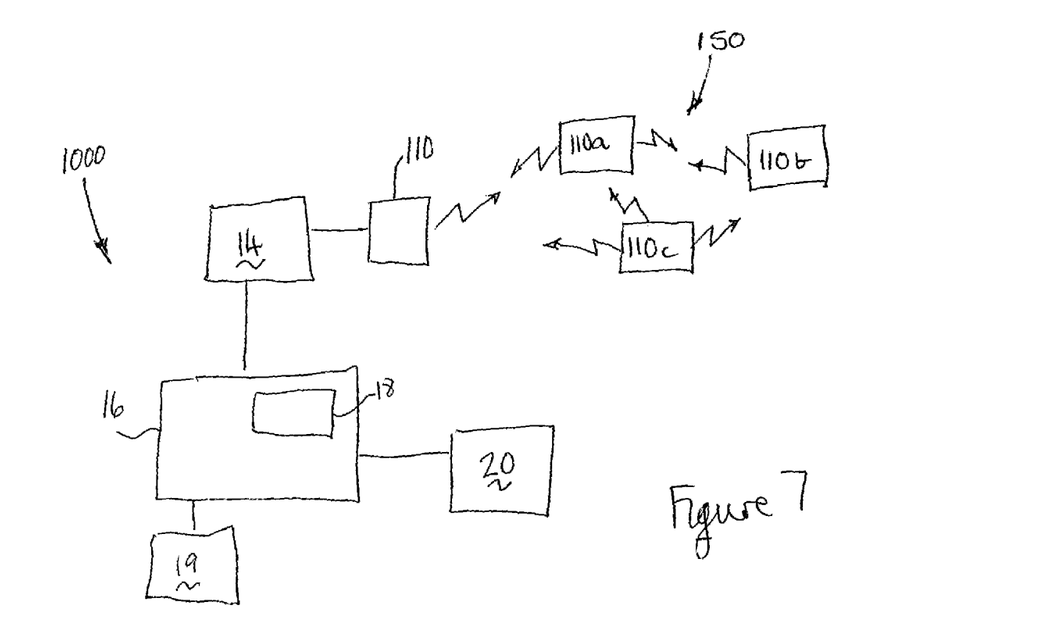
FIG. 7 is a schematic of a Follow-me system according to another embodiment of the present invention.

An alternative or additional system 1000 is illustrated in FIG. 7. Here, a communication network 150 is established between a communication module 110 in the follower vehicle and corresponding modules 110a,b,c in other vehicles that are in the vicinity of the follower vehicle. Presently, such a system does not exist, but it is proposed that vehicles produced in the future may be fitted with such a module 110. The purpose of such a system is to enable warnings to be communicated between multiple vehicles using the road in a given territory, whereby hazards of blocked roads or stationary vehicles can be communicated between adjacent vehicles for the purpose of warning their drivers of road conditions ahead. Inherent in such a network is each module 110, 110a,b,c, knowing its position and communicating that position to others on the network. That implies each has its own unique identifier. Communications would most likely carry other information that would be useful for such a system, including vehicle speed and direction. Also inherent in such a system is communication by a given module, not only of the condition of the vehicle in question, but also of adjacent vehicles that have communicated with the vehicle in question. Thus each vehicle is constantly transmitting data, not only about itself, but also about neighbours up and down the road. Clearly, such a system has the capacity to overload rapidly and therefore also requires a mitigation system to prevent that overload, but, equally, it could be configured to transmit the location of subject vehicle module 110b to follower vehicle module 110 via as many intervening modules (110a, 110c etc) as may be necessary to complete the communication.

Consequently, it is perfectly feasible for the follower vehicle to be fed position information of a given subject vehicle and such information to be communicated to the SatNav system 16. However, such an arrangement depends on many vehicles being fitted with the modules 110, which is likely to be the case only if a concerted national or regional effort is made in given territories for such a system to be implemented. If and when such a system is implemented, it may supplant or supplement the systems 10, 100 described above.

Thus the present invention is predicated on a satellite navigation system in a vehicle being configured to give directions towards a moving, or continually updating, destination and for that destination to be input not by user selection of a given position but through one of several different means, whether an entirely internal system such as the optical sensing for tracking of a moving target, or by communication from the target of its position.

Figure 8:
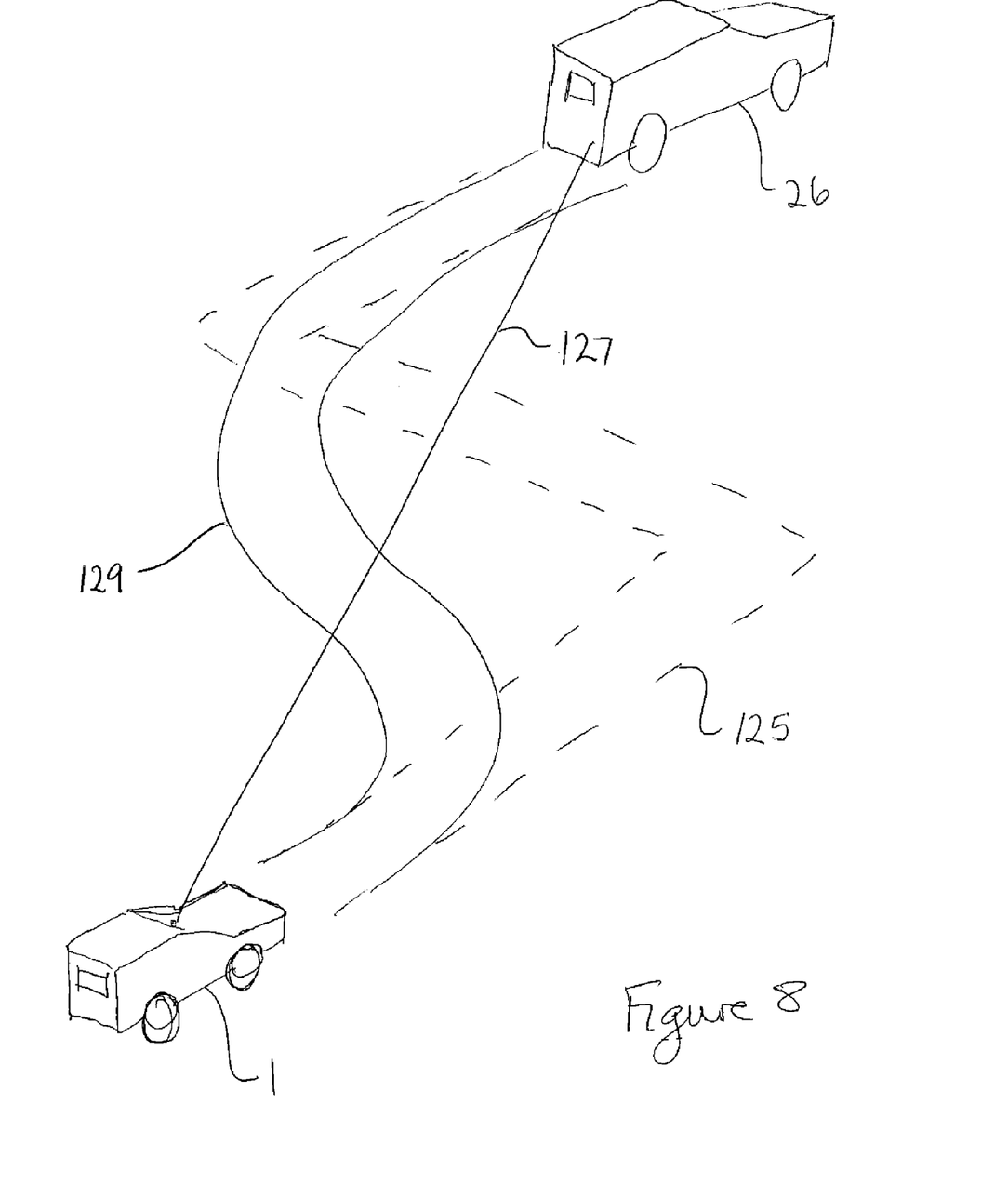
FIG. 8 is an illustration of a follower vehicle following a subject vehicle.

It is a further aspect of the present invention that the instructions given by the SatNav system to achieve following of the subject (vehicle or otherwise) may not solely comprise instructions to ultimately reach a destination, but might also comprise following the precise route. This might especially be relevant in an off-road context where there may not be specific roads for the SatNav system to follow. In FIG. 8, a follower vehicle 1 is tracking the position of a subject vehicle 26. It may track the subject vehicle using one of the systems described above. It may be that there is a road 125 in the SatNav system's map stored in its memory 19, which the SatNav would ordinarily employ to reach the destination represented by the current position of the subject vehicle 26. On the other hand, there may be no such road, in which event the SatNav would navigate the follower vehicle by the shortest route, being a straight line 127. However, the dynamic route finding system of the present invention may be configured not only to navigate to the destination but also to employ the route taken by the subject vehicle, illustrated by tracks 129 in FIG. 8. This arrangement involves the SatNav guiding sequentially to each destination in turn, as determined by the system on each updating of the destination as the subject vehicle changes its position. This might be the case whether or not a road 125 is actually present on the ground.

Finally, and perhaps especially in the case of the follower vehicle being selected to follow in the tracks of the subject vehicle, and not only its dynamic destination, the guidance provided by the SatNav may not merely comprise audible or oral instructions to a driver, or route instructions shown on the SatNav display 18, but instead be direct commands to the steering of the follower vehicle. Indeed, completely autonomous control of the follower vehicle may be provided, where its speed and direction is entirely in the hands of the SatNav system as it follows a subject vehicle using the system of the present invention.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A system for a vehicle, the system comprising:
a display, for disposition inside the vehicle;
a navigation system, employing satellite position sensing for the vehicle;
a storage device, including map data of a given territory; and
an input system for the navigation system to input a location of a potentially dynamic destination of a subject,
wherein the navigation system is arranged to permit dynamic updating of the destination through said input system while guiding a user towards the subject from a current position of the user,
wherein the input system comprises:
an optical sensor for front-facing disposition in the vehicle;
a computer configured to display on the display images captured by the optical sensor; and
a user interface configured to enable user commands to be input to the computer, the computer being arranged to dynamically calculate a position of the subject that:
is captured as an image by the optical sensor, and
has been displayed on the display, and
has been selected by the user, and
to input the position of the subject as a destination of the navigation system.

2. The system of claim 1, in which the subject is another vehicle.

3. The system of claim 1, in which the input system is adapted to update the position of the subject when the subject moves.

4. The system of claim 1, in which the position of the subject is estimated from historical movements of the subject.

5. The system of claim 1, in which the optical sensor is a camera.

6. The system of claim 1, in which the optical sensor is that of an emergency braking system.

7. The system of claim 6, in which the computer is a computer of one of the emergency braking system and satellite navigation system, and is arranged to correlate data from the emergency braking system and satellite navigation system.

8. The system of claim 1, in which the display is a touch screen whereby instructions as to an identity of the subject are entered by touching the screen in a vicinity of an image of the subject.

9. The system of claim 8, in which the subject is indicated as an object identified by the computer from image data currently received from the optical sensor by highlighting the object.

10. The system of claim 1, in which the input system comprises a telephone transceiver capable of wireless communication with a telephone of a follower vehicle through a wireless telephone network, the telephone transceiver being adapted to receive a position of the subject telephone through the wireless telephone network and transmit it to the navigation system for use as the destination of a navigation system of the follower vehicle.

11. The system of claim 10 in combination with the telephone of the follower vehicle, in which the telephone of the follower vehicle has a GPS position sensor and has an application installed to effect transmission of a position of the telephone of the follower vehicle through the wireless telephone network.

12. The system of claim 11,
wherein the application is adapted to transmit the position of the telephone of the follower vehicle as and when that position changes; and
wherein the input system updates the destination of the navigation system when a new position of the telephone of the follower vehicle is received.

13. The system of claim 10, in which:
the transceiver is integrated with the navigation system; or
the transceiver is provided for on-board integration in the vehicle separate from the navigation system; or
the transceiver is an entirely separate mobile telephone of the driver of the follower vehicle in which the dynamic route finding system is fitted, wherein said mobile telephone includes a connector for connection with the navigation system.

14. The system of claim 13, in which the connector is wireless.

15. The system of claim 1, in which the input system comprises an inter-vehicle wireless communication module that enables communication with multiple adjacent vehicles in a vicinity of the follower vehicle and also provided with similar communication modules, wherein, when a communication network is established through the adjacent vehicles and with more remote vehicles also provided with similar communication modules, and when a position of a subject vehicle, which subject vehicle being one of said adjacent or more remote vehicles, is communicated through said network to the follower vehicle, said wireless communication module is adapted to input said communicated position as the destination of the navigation system.

16. The system of claim 1, wherein the navigation system is configured to provide audible or visual instructions to a driver of the vehicle.

17. The system of claim 1, wherein the navigation system is configured to actively control the follower vehicle.

18. The system of claim 17, in which the navigation system is adapted to control the follower vehicle to follow a route of the subject in reaching a current location.

19. A vehicle comprising the system of claim 1.

20. A method of operating a follower vehicle incorporating a system as claimed in claim 1, the method comprising:

a) invoking a "Follow-me" function of the navigation system;
b) operating the input system to enter the position of the subject as a destination for the navigation system;
c) updating the destination as the subject moves; and
d) providing user navigation system instructions to drive to the destination.

\* \* \* \* \*